United States Patent [19]
Uhl

[11] Patent Number: 4,609,007
[45] Date of Patent: Sep. 2, 1986

[54] MIXING VALVE FOR CONNECTION TO HOT AND COLD WATER SUPPLY LINES FOR FEEDING A VARIABLY PROPORTIONED MIXTURE OF HOT AND COLD WATER TO A SHOWER HEAD OR THE LIKE

[75] Inventor: John B. Uhl, Morgantown, W. Va.

[73] Assignee: Sterling Faucet Company, Morgantown, W. Va.

[21] Appl. No.: 546,202

[22] Filed: Oct. 27, 1983

[51] Int. Cl.$^4$ .............................................. F16K 11/06
[52] U.S. Cl. ................................. 137/270; 137/625.41
[58] Field of Search ........... 137/625.41, 625.4, 625.46, 137/269, 270, 271, 357, 454.6, 454.2; 251/288, 286

[56] References Cited

U.S. PATENT DOCUMENTS

| Re. 27,036 | 1/1971 | Miller . | |
|---|---|---|---|
| 796,252 | 8/1905 | Ross et al. . | |
| 1,313,105 | 8/1919 | Moran . | |
| 1,427,606 | 8/1922 | Leahy . | |
| 1,527,927 | 2/1925 | Schroder . | |
| 2,528,272 | 10/1950 | Gilman . | |
| 2,911,008 | 11/1959 | DuBois . | |
| 3,023,784 | 3/1962 | Monson . | |
| 3,171,441 | 3/1965 | Schonfeld . | |
| 3,410,487 | 11/1968 | Hyde . | |
| 3,437,273 | 4/1969 | Hagfors . | |
| 3,526,250 | 9/1970 | Miller . | |
| 3,543,799 | 12/1970 | Hayman . | |
| 3,625,255 | 12/1971 | Genin | 137/625.41 |
| 3,674,048 | 7/1972 | Manoogian et al. | 137/625.41 |
| 3,680,592 | 8/1972 | Hayman . | |
| 3,726,318 | 4/1973 | Hyde . | |
| 3,830,257 | 8/1974 | Metivier . | |
| 3,916,951 | 11/1975 | Schmitt | 137/625.41 |
| 3,921,659 | 11/1975 | Rudewick, III . | |
| 3,987,819 | 10/1976 | Scheuermann . | |
| 4,089,347 | 5/1978 | Christo . | |
| 4,397,330 | 8/1983 | Hayman | 137/270 |
| 4,423,752 | 1/1984 | Psarouthakis | 137/270 X |

Primary Examiner—Martin P. Schwadron
Assistant Examiner—John S. Starsiak, Jr.
Attorney, Agent, or Firm—Leydig, Voit & Mayer, Ltd.

[57] ABSTRACT

A mixing valve for connection to hot and cold supply lines for feeding a variably proportioned mixture of hot and cold water to a shower head or the like is disclosed. A valve body presents a planar discharge surface having spaced hot and cold inlet orifices with an outlet orifice generally centered on an axis between them. A cap of inverted cup shape has a rim sealed with respect to the discharge surface and has a circular end wall with an axial opening formed therein. Arranged on the axis is a rotor having a shaft which extends through the axial opening and which is in the form of a disc having a plurality of hollow pedestals with blind openings facing the discharge surface. Resilient sealing pads are respectively telescoped into the blind openings, each sealing pad having an associated coil spring for biasing the pad into engagement with the discharge surface. Stops limit the range of rotor rotation to more than 90° but less than 180°. The sealing pads include a pair of generally circular pads of limited arcuate extent sealingly engageable with the cold inlet orifices at the respective limits of rotor rotation. A single pad of approximately double the arcuate extent of one of the circular pads is sealingly engageably with the hot inlet orifice during approximately the first half of the range of rotor rotation thereby providing a gradual transformation from cold to hot at the outlet orifice.

12 Claims, 31 Drawing Figures

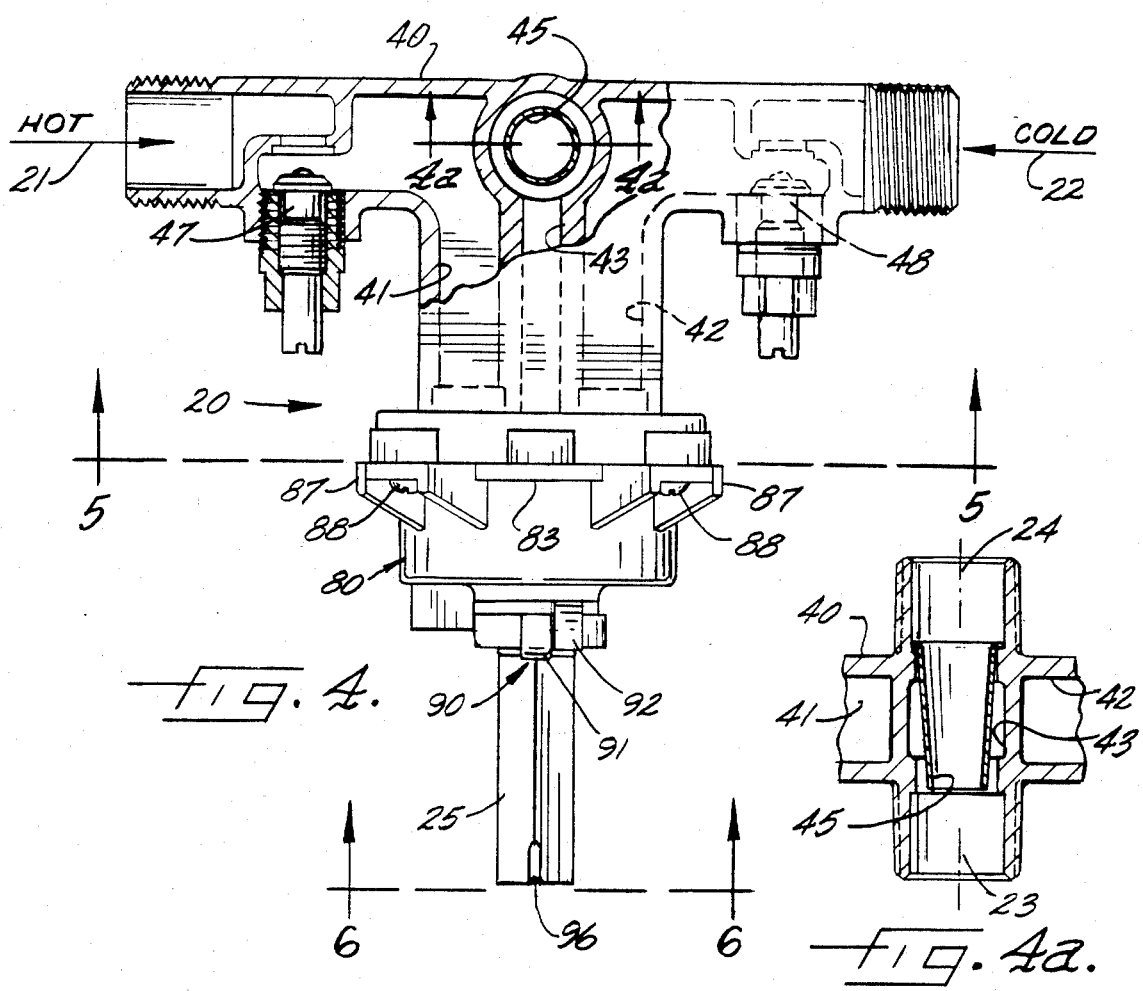
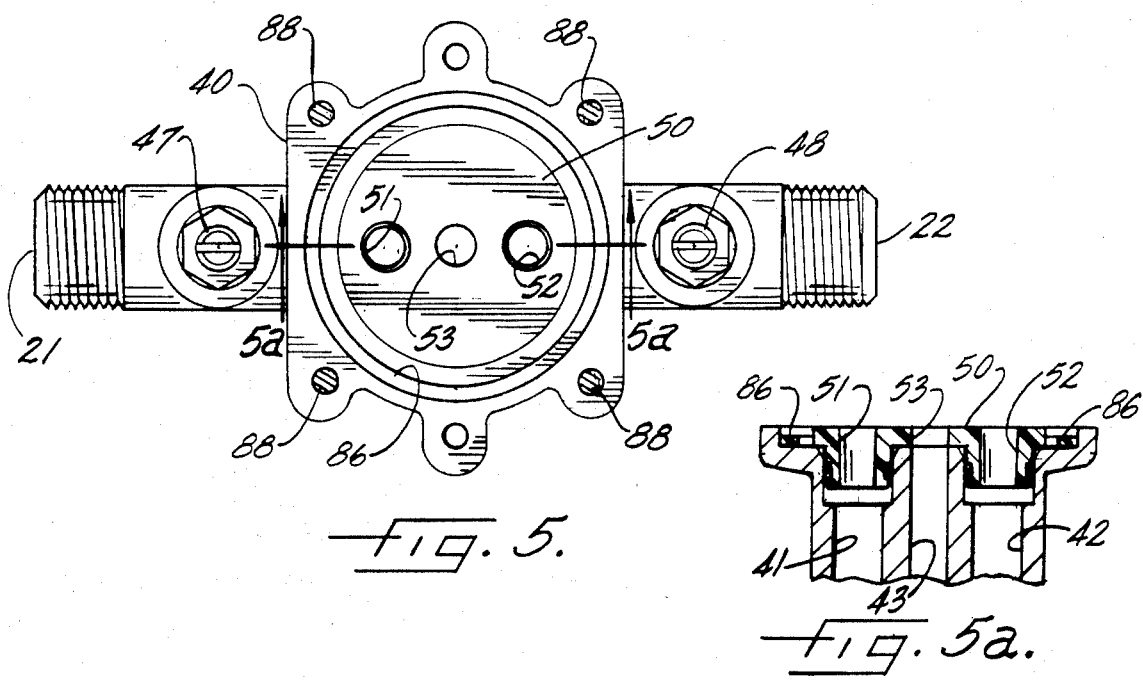

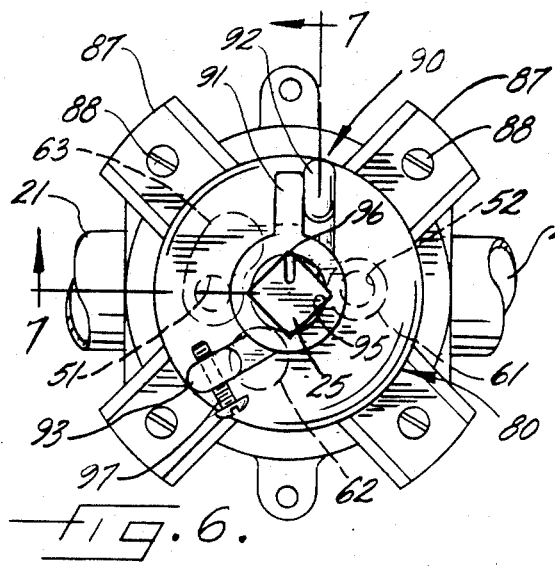

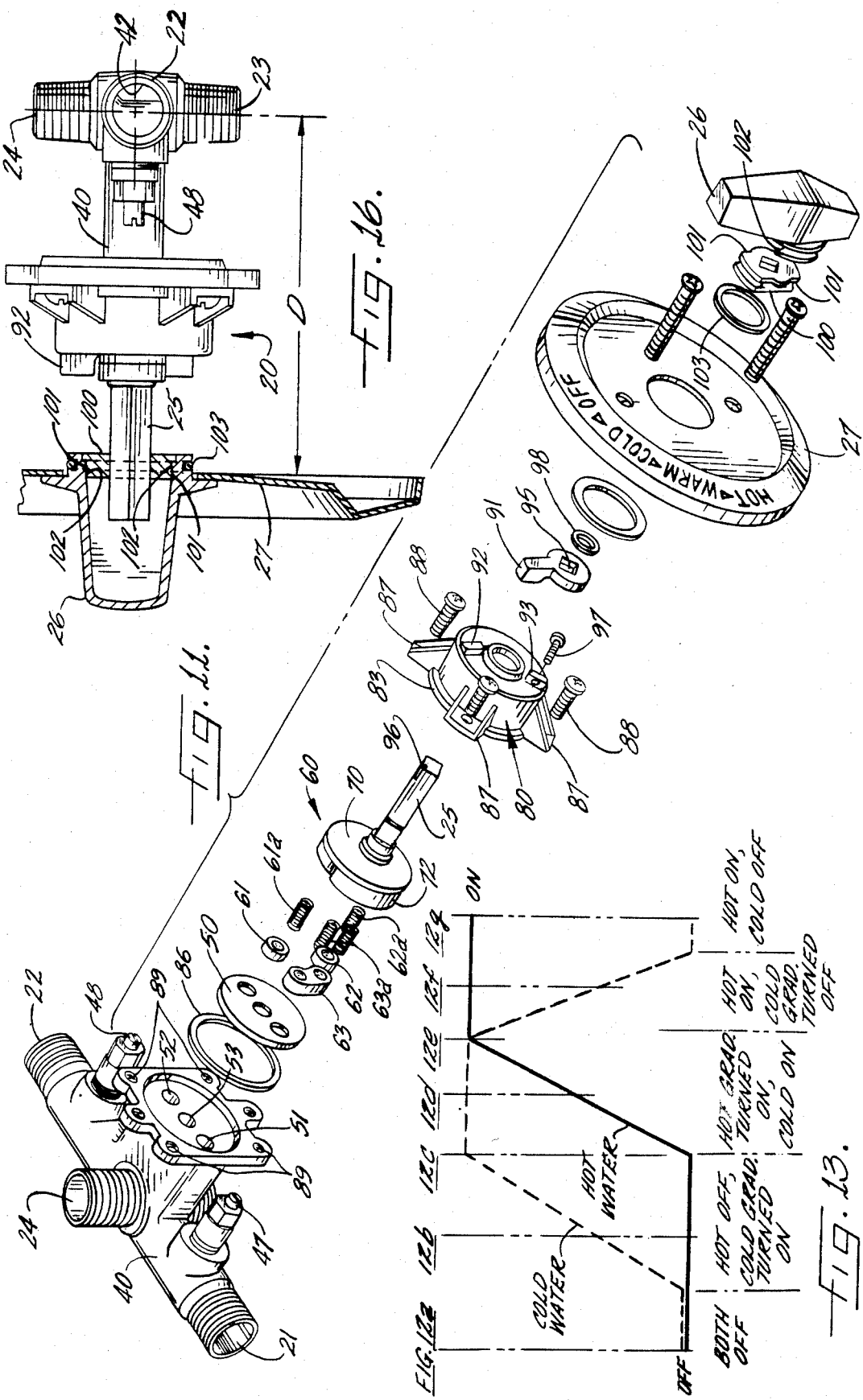

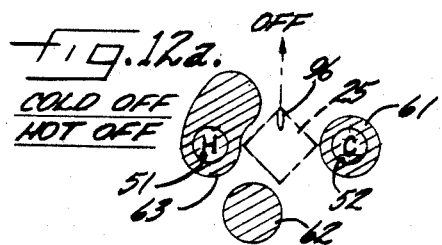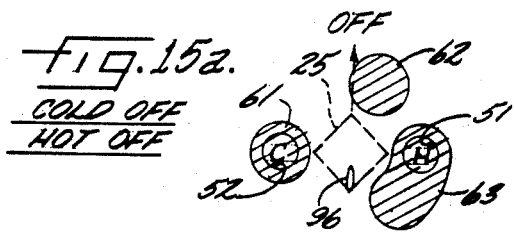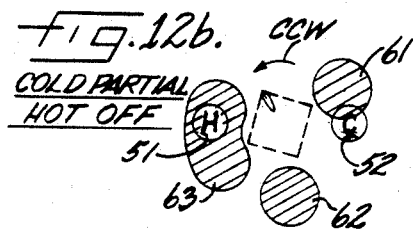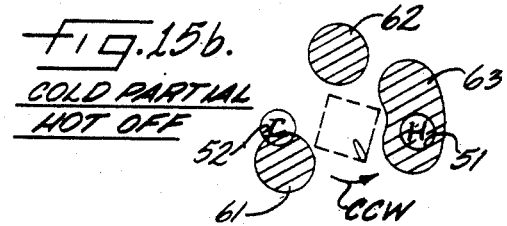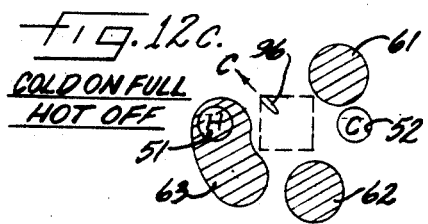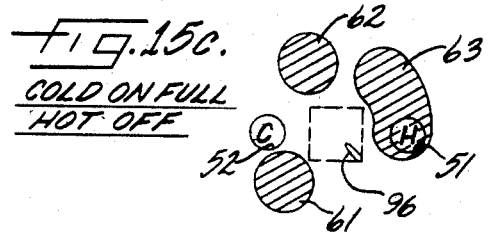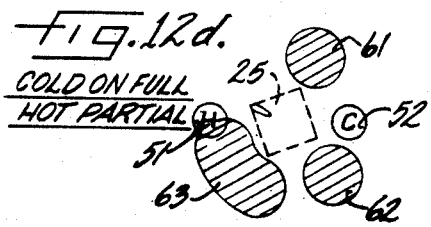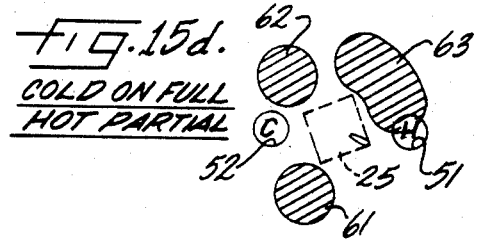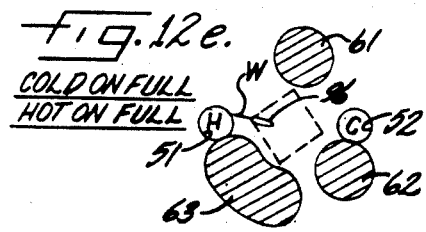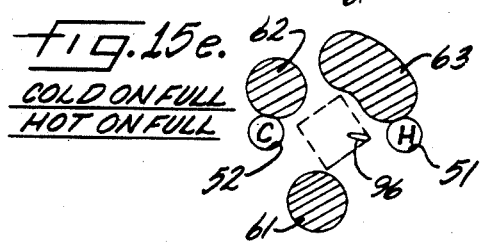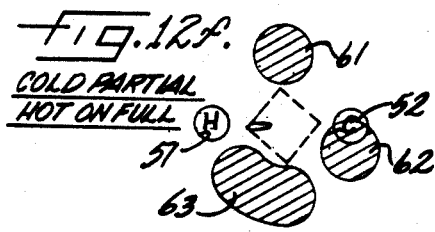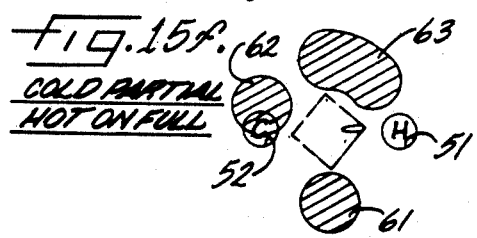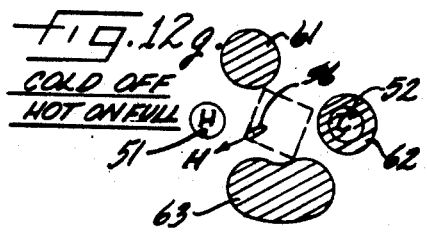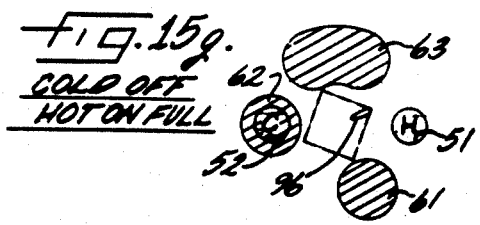

MIXING VALVE FOR CONNECTION TO HOT AND COLD WATER SUPPLY LINES FOR FEEDING A VARIABLY PROPORTIONED MIXTURE OF HOT AND COLD WATER TO A SHOWER HEAD OR THE LIKE

The prior art relating to mixing valves for showers and tubs is well represented by Manoogian et al. U.S. Pat. No. 3,674,048 which issued in 1972. In such construction a valve body has a bore with hot and cold water inlet ports opening into the inner end wall thereof. A bushing encloses the outer end of the bore and defines a mixing chamber. A valve disc is rotatable against the inner end wall of the bore. The valve disc has a pair of arcuately shaped passages extending axially through the disc and which are registerable with the hot and cold water inlet ports to permit the flow of water into the mixing chamber, which lies between the disc and the bushing. Water from the mixing chamber escapes through cutouts formed in the outer edge of the disc.

Prior art devices such as that described leave much to be desired. They are relatively complex and expensive, critical of adjustment because of the simultaneous changing of the effective orifice size in opposite directions and are not readily susceptible to back-to-back mounting. The prior devices have a tendency toward leakage, being affected by accumulations of lime, and maintenance, when required, is unnecessarily difficult. Installation is critical since the supply piping is required to be at a certain optimum depth behind the wall surface.

It is, accordingly, an object of the present invention to provide a mixing valve for a shower or the like which is extremely simple and inexpensive, which provides a smooth and extended control motion enabling a more controlled and gradual transformation from cold to hot at the outlet orifice, which is substantially leakproof, and which may be serviced, if necessary, quickly and easily, with substantially all of the functional parts being contained in a separable subassembly having a long useful life. In one of the aspects of the invention it is an object to provide a mixing valve which is easily installed, which is highly tolerant as to the depth, behind the wall surface, of the supply piping, in which the handle always extends the same distance from the wall, and which is easily and quickly adapted to (a) a "normal" installation in which the hot and cold piping are at the left and right hand sides respectively or (b) a "reversed" installation, as required where bathrooms are arranged, as is so often the case, back-to-back to utilize common supply piping.

Other objects and advantages of the invention will become apparent upon reading the attached detailed description and upon reference to the drawings in which:

FIG. 4 is a top view of the valve body, as viewed along line 4—4 in FIG. 3, with certain portions broken away.

FIG. 4a is a fragmentary section looking along line 4a—4a in FIG. 4 and showing the venturi which is embodied in the valve body.

FIG. 5 is a cross sectional view taken along line 5—5 in FIG. 4 and showing, in face view, the planar discharge surface.

FIG. 5a is a fragmentary section looking along line 5a—5a in FIG. 5 revealing the nature of the plastic insert.

FIG. 6 is an external view looking along line 6—6 in FIG. 4 showing the fixed and movable stops which limit the range of shaft movement.

FIG. 7 is a cross sectional view looking along line 7—7 in FIG. 6.

FIG. 8 is a fragmentary perspective showing the pedestals on the rotor disc.

FIGS. 9 and 10 are cross sections of the rotor taken through the pedestals on correspondingly numbered lines in FIG. 8.

FIG. 11 is an exploded perspective of the valve assembly.

FIGS. 12a–12g are a series of diagrams showing the rotor in successive angular positions.

FIG. 13 is a plot showing the variation in valve orifice as a function of rotor angle.

FIG. 14 is a view similar to FIG. 6 but showing the rotor shaft occupying its alternate, 180° reversed, position to enable connection to reversely positioned hot and cold water supply lines particularly in back-to-back installations.

FIGS. 15a–15g are a series of diagrams showing the perspective uncovering of valve ports with the rotor in its 180° reversed position.

FIG. 16 is a view similar to FIG. 3 but showing an arrangement in which the supply pipes are located in a more deeply recessed position.

While the invention has been described in connection with a preferred embodiment, it will be understood that it is not intended to limit the invention thereto but it is, on the contrary, intended to cover the various alternative and equivalent forms of the invention included within the spirit and scope of the appended claims.

Figure 1:
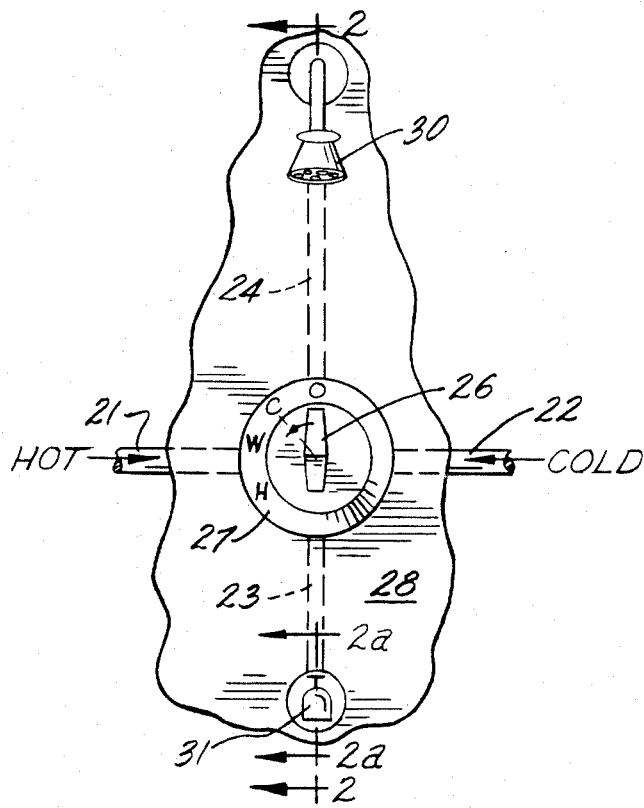
FIG. 1 is a diagram showing, in face elevation, a typical installation of mixing valve used for feeding a shower head or a tub spout.
Figure 2:
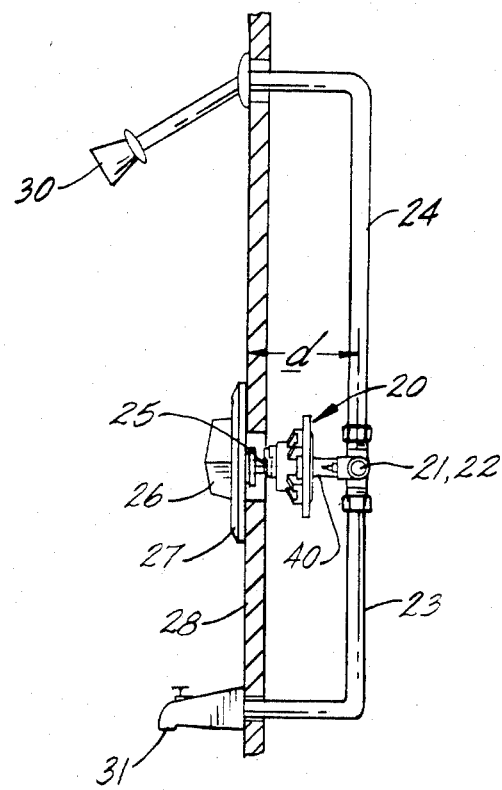
FIG. 2 is a side view of the installation of FIG. 1.
Figure 2A:
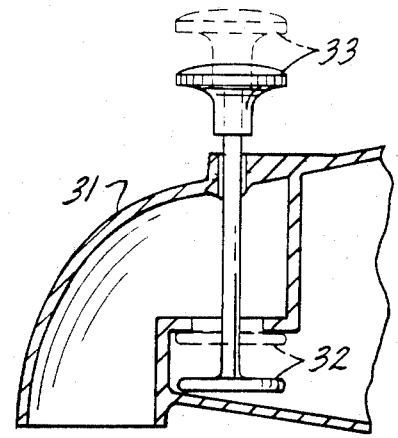
FIG. 2a is an enlarged fragmentary cross section of the spout taken along line 2a—2a in FIG. 1.

Turning now to the drawings, there is disclosed in FIGS. 1 and 2 a typical mixing valve installation for the proportioning of hot and cold water to a shower head and spout of a bath tub. The mixing valve, generally indicated at 20, has hot and cold water inlet pipes 21, 22 as well as spout and shower connections 23, 24. The mixing valve has a control shaft, or stem, 25 which engages a knob 26 associated with an escutcheon 27 secured to the wall 28. The shower head connection 24 leads to a shower head 30 while the spout connection 23 leads to a spout 31. The spout 31 is constructed as shown in FIG. 2a including a lift valve 32 having a handle 33 which, when lifted to its upraised position, seals off the spout and directs the mixed water to the shower head 30.

Figure 3:
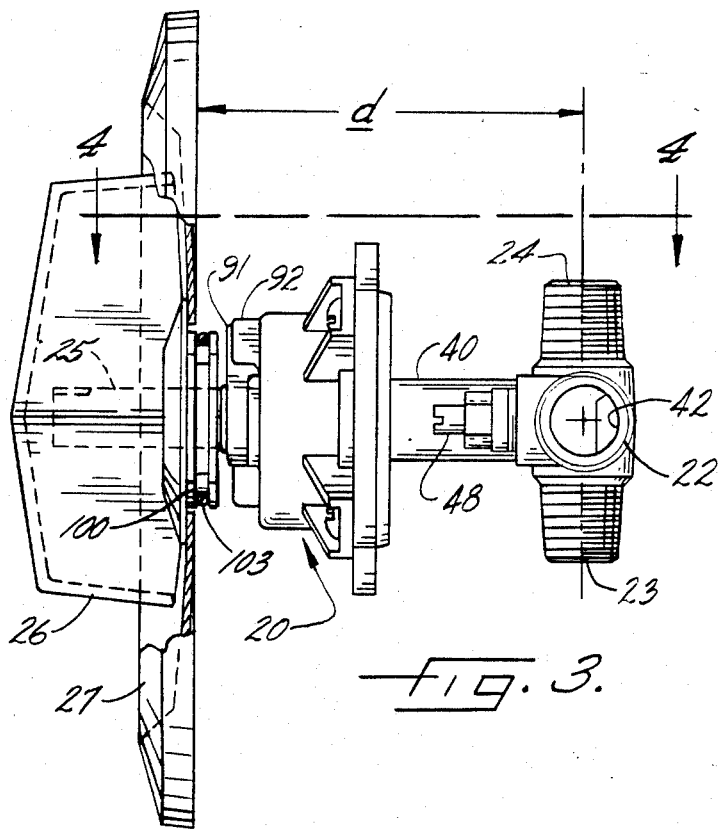
FIG. 3 is an enlarged side view of the body of the mixing valve and its associated control knob based upon FIG. 2.

The base element of the device is a valve body 40 shown in FIGS. 3, 4 and 5. The body, which may be conveniently in the form of a casting of brass or the like has an internal hot water passage 41, a cold water passage 42 and an axial passage 43. The passages 41, 42 are respectively in communication with the hot and cold water lines 21, 22 while the axial passage 43 communicates with both the spout and shower connections 23, 24 as shown in FIG. 4a. It is a minor structural feature of the valve body that it includes a venturi 45 as illustrated in FIG. 4a which, as is known in the art, serves to prevent the flow of water to the shower head as long as the spout connection is open.

Since the line pressure may be considerably different in the hot and cold water supply lines, the connections 21, 22 include respective throttle valves 47, 48 which may be correctively adjusted to balance the flow ((FIGS. 3 and 4).

The valve body internally presents (FIGS. 5 and 5a) a planar discharge surface 50 which is perpendicular to the axis and which includes spaced hot and cold inlet orifices 51, 52 as well as an outlet orifice 53 generally centered on the axis between them and communicating with the corresponding passages indicated in FIG. 4. It is one of the structural features of the device that the planar discharge surface 50, shown in FIG. 5a is formed of a disc of resilient plastic, such as Teflon, chosen for minimum friction and having provision, in the form of O-rings, for sealing connection to the pressurized supply passages 41, 42.

In accordance with the present invention, a rotor is arranged on the axis opposite the discharge surface 50 having a plurality of axially projecting and arcuately spaced sealing pads terminating in a plane which is perpendicular to the axis and which engage the discharge surface at a radius from the axis corresponding to the radius of the inlet orifices. Stops are provided for limiting the range of rotor rotation from the beginning to end positions to more than 90° but less than 180° and the sealing pads are so angularly positioned on the rotor that during the course of rotor rotation (a) both inlet orifices are covered, (b) the cold orifice is progressively uncovered while the hot orifice remains covered, (c) the hot orifice is progressively uncovered while the cold orifice remains uncovered and (d) the cold orifice is progressively covered while the hot orifice remains uncovered thereby providing independent variation in the flow of hot and cold water to produce a gradual transformation from cold to hot as the rotor is turned. More specifically, in accordance with the invention, the rotor includes a disc having a plurality of axially projecting pedestals, the resilient sealing pads being mounted on the pedestals and the pedestals having an axial dimension substantially greater than the thickness of the disc so as to provide substantial spacing between the disc and the discharge surface for mixing of the hot and cold water in the space surrounding the pedestals prior to discharge of the water in the mixed condition from the outlet orifice.

Referring particularly to FIGS. 7-10, there is, cooperating with the discharge surface 50, a rotor 60 having sealing pads 61, 62 and 63 which project axially from the rotor and which terminate in a plane 64 (see FIG. 7) perpendicular to the rotor axis. The sealing pads 61, 62 cooperate with the cold water inlet orifice 52 and are arranged at substantially the same radius. The sealing pad 63 cooperates with the hot water inlet orifice 51 and is arranged at an equal radius with respect to the latter. In carrying out the invention, the sealing pads 61-63 are mounted upon pedestals which are secured to, and preferably integral with, a disc which forms part of the rotor structure. Thus, as shown in FIG. 8, the rotor includes a disc 70 having pedestals 71, 72 projecting axially therefrom, the pedestals having an axial dimension which is substantially greater than the thickness of the disc to provide a substantial mixing space surrounding the pedestals and which is between the disc and the planar discharge surface.

In carrying out the invention, the pedestals are hollow and have respective axially oriented blind openings facing a discharge surface and the resilient sealing pads are respectively telescoped into the openings and closely but slidably fitted with respect thereto, each sealing pad having an associated coil spring seated in the rotor for biasing the pad axially into sealing engagement with the discharge surface. The springs, visible in FIGS. 9 and 10, and also shown in FIG. 11, have been indicated at 61a, 62a and 63a corresponding to the sealing pads. The springs urge the sealing pads outwardly with respect to the blind openings in which they are fitted, that is, in a direction against the discharge surface 50 on the valve body. However, such springs are not relied upon to form a seal with respect to the discharge surface. Thus, to augment the sealing force, particularly where the water line pressure may be high, each of the pads 61-63 has an axial through-opening 61b, 62b or 63b so that the pressure of the inlet water, when the pad is engaged with an inlet orifice acts to assist the associated spring. Thus as illustrated in FIG. 9, the water pressure applied to the pad by the inlet orifice which it engages acts in the direction of the vectors to augment the sealing force of the associated spring in direct proportion to the applied pressure from the water line. The sealing pads may be formed of any desirable material capable of creating a seal against the discharge surface but it is preferred to use synthetic rubber, specifically, butyl rubber having a durometer rating on the shore A scale on the order of about 80.

In accordance with one of the features of the present invention, the rotor is enclosed by a cap of inverted cup shape having a rim sealed with respect to the planar discharge surface and having an end wall with an axial opening, the rotor being mounted coaxially within the cap and having a shaft which extends through the axial opening and with the disc and cap relatively dimensioned so that the disc on the rotor substantially spans the space within the cap. Thus, referring to FIGS. 6 and 7, I provide a cap 80 having a circular end wall 81, a cylindrical side wall 82 and a rim 83. The end wall 81 has an axial opening 84 which is penetrated by the shaft 25 and which is sealed thereto by an O-ring 85. The rim 83 of the cap is sealed with respect to the discharge surface 50 by means of an O-ring 86. For securing the cap to the valve body 40 the cap has, integrally formed thereon, a set of four lugs 87 which are penetrated by clamping screws 88 which screw into threaded openings 89 (see FIG. 11) in the valve body.

As previously stated, stops are provided for limiting the swinging movement of the control shaft to an angle which is greater than 90° but which is less than 180°. This is accomplished by a stop assembly 90 which includes a movable stop 91 registered on the shaft 25, a beginning fixed stop 92 and a terminal fixed stop 93 (see FIG. 6). The fixed stops are integrally molded in the cap while the movable stop, is, in accordance with one of the features of the invention, removably reassemblable with the shaft so as to occupy two positions, a first or normal position (FIG. 6) and a second or "reversed" position 180° (FIG. 14) when the rotor shaft 25 is rotated relative to the first position. To this end the movable stop 91 has an axial opening of square configuration, indicated at 95, which mates with the square cross section of the shaft 25. As shown in FIG. 6, a groove 96 is provided in one of the corners of the shaft as a reference, the groove being normally aligned with the extending tab portion of the movable stop.

In order to visualize the manner in which cold and hot inlet orifices are progressively uncovered and covered by the resilient sealing pads in order to achieve independent variation of the hot and cold water, reference is made to FIGS. 12a–12g which comprise a set of stop motion diagrams. It is to be noted in these figures that the shaded regions represent the area covered by the sealing pads, in other words the effective sealing area, without reference to the area of the pedestals which support the sealing pads. The sealing pads 61 and 62 which are intended to cooperate with the cold water inlet orifice 52 are preferably circular in shape having a diameter which is on the order of twice the diameter of the cooperating orifice. Thus, in a practical case, the sealing pads 61, 62 may have a diameter of approximately a centimeter while the cold water inlet orifice has a diameter on the order of half a centimeter. In contrast, the sealing pad 63, which is intended to cooperate with the hot water inlet orifice 51, is arcuately or, more specifically, kidney-shaped having an arcuate length on the order of 2 centimeters or slightly less. The pads 61–63 are so angularly spaced on the disc that the pads 61, 62 are fully engageable with the cold water inlet orifice at the respective limits of rotor rotation while the single pad 63, which cooperates with the hot water inlet orifice, is engageable with the hot inlet orifice during approximately the first half of the range of rotor rotation. This will be made clear by successive consideration of FIGS. 12a–12g in connection with the correspondingly labeled flow diagram FIG. 13.

In the "off" condition illustrated in FIG. 12a the cold water orifice 52 is sealed by the pad 61 and the hot water orifice 51 is sealed by the pad 63; thus no water can flow. As the shaft 25 is turned in the counterclockwise direction, the hot water orifice 51 continues to be covered by the pad 63, because of its elongated shape, while the cold water orifice 52 is partially uncovered resulting in a partial flow of cold water, as shown in FIG. 12b. As the shaft rotation is continued, as shown in FIG. 12c, the cold orifice is completely uncovered resulting in a full flow of cold water while the hot water inlet orifice 51 still remains completely covered.

Rocking the shaft further in the counterclockwise direction retains the cold water on with full force while partially uncovering the hot inlet orifice so that the cold water is tempered with hot to produce a warm condition at the outlet as shown in FIG. 12d.

Continuing the counterclockwise rotation of the shaft the cold water remains on full while the hot water orifice is progressively uncovered so that, as in FIG. 12e, both orifices 51, 52 are equally uncovered to produce a mean temperature condition.

As the shaft is rocked still further the cold water inlet orifice is progressively engaged by the sealing pad 62, cutting down the flow of cold water, while the hot water flows without constriction as illustrated in FIG. 12f. Finally, as the shaft is rocked fully counterclockwise in the direction of the terminal stop, as in FIG. 12g, the flow from the cold orifice is completely cut off while the flow from the hot orifice remains on full resulting in a maximum hot condition at the output. If desired, the terminal stop 93 may be fitted with an adjustable stop screw 97 (FIG. 6) to limit the upper temperature which is achievable by the valve, a feature which is particularly desirable where the device is used in a motel or the like.

The above description has assumed that the device is installed in a "normal" installation where the hot water inlet pipe is at the left and the cold water inlet pipe is at the right. However, as those skilled in the art are aware, this condition is not always achievable as, for example, in the case of bathrooms arranged back-to-back where the spouts and shower heads on the opposite sides are serviced by the same set of supply pipes; thus, for the second device the cold water line will be at the left and the hot at the right. In the past, this has sometimes required the use of "cross over" pipes. However, it is one of the features of the present construction that it is readily adaptable to the reversed condition by simply reversing the position of the movable stop on the shaft through an angle of 180°, repositioning the rotor so that the movable stop again lies between the two fixed stops, thereby saving the cost of cross over connections. This reversed condition of the movable stop is illustrated in FIG. 14 which is arranged beside FIG. 6, and the effect of the reversal is illustrated in the stop motion set of views 15a–15g corresponding to FIGS. 12a–12g, respectively.

To reverse the stop 91 with respect to the rotor, the stop 91 is simply slid endwise off of the shaft 25, temporarily removing the O-ring 98 (FIG. 7) which serves as a retainer. The shaft 25 is then rotated 180° relative to the stop 91 so that the tab of the stop is directly opposite the reference groove 96 (FIG. 14), instead of being aligned with it. Movable stop 91 is then replaced and still occupies a position between the fixed stops when the movable stop is again fully seated in its new position.

Referring to FIG. 15a, which shows the initial off condition, it will be noted that the left-hand orifice 51 now supplies the cold water while the orifice 52 supplies the hot. Initially, the cold water orifice 51 is covered by the sealing pad 61 while a hot water orifice 52 is covered by the pad 63 so that no flow occurs. Rocking the shaft again counterclockwise away from the beginning stop 92, the cold water orifice 51 is progressively uncovered while the hot water orifice remains fully covered as illustrated in FIG. 15b. By the time the condition 15c is reached, the cold water orifice is completely uncovered resulting in a full flow of cold water. However, as the shaft is rocked further in the counterclockwise direction, the hot water orifice, at 51, is progressively uncovered so that hot water tempers the cold. Continued movement, illustrated in FIG. 15e results in both the hot and cold water orifices being completely open. In FIGS. 15f and 15g the hot water orifice 52 remains uncovered while the cold water is progressively shut off resulting in an increasingly hotter mix until the terminal stop is reached.

Thus, it is seen that because of the novel reversibility feature of the present valve, both normal and reversed installations can be accommodated without necessity for changing the direction of rocking of the control shaft and without necessity for making any change in the escutcheon or the calibrations which are normally provided thereon.

It is one of the features of the present construction that the supply pipes 21, 22 (FIG. 1) to which the valve is connected need not be located at a particular depth behind the wall surface which supports the escutcheon. Thus, in accordance with the invention the knob 26 is made axially captive in the escutcheon 27 and a deep axial hole is provided in the knob profiled to mate with the shaft in free telescoped relation permitting a wide variation in the spacing between the wall surface, that is behind the escutcheon, and the piping connections. As illustrated in FIGS. 2 and 3 which shows the "close coupled" condition, that is, minimum spacing d between the escutcheon and piping, the shaft 25 is fully inserted into the knob 26. For the purpose of securing axial captivity between the handle 26 and the escutcheon, the knob is provided with an insert 100 having flatted sides 101 which mate with flatted surfaces 102 on the knob (See FIGS. 11 and 16). Thus, when the insert is inserted into the knob, the insert lies behind the escutcheon while the knob is in forward position. An O-ring 103 encircles the rear end of the knob and the insert holding them in coplanar relation so that the knob can move neither forwardly or backwardly relative to the escutcheon. However, the control shaft can slide relatively inwardly or outwardly with respect to the insert and knob thereby to accommodate greater spacings D between the piping and supporting wall as illustrated in FIG. 16, which illustrates the condition of maximum or piping depth. In short, the knob will always extend the same distance from the wall.

I claim as my invention:

1. A mixing valve for connection to hot and cold water supply lines for feeding a variably proportioned mixture of hot and cold water to a shower head or the like comprising, in combination, a valve body presenting a planar discharge surface having spaced hot and cold inlet orifices with an outlet orifice generally centered on an axis between the inlet orifices, a rotor on the axis and arranged opposite the discharge surface, the rotor having a plurality of arcuately spaced pedestals projecting axially in the direction of said discharge surface, a plurality of axially projecting sealing pads of resilient material mounted on said pedestals and terminating in a plane perpendicular to the axis and engaging the discharge surface at a radius from the axis corresponding to the radius of the inlet orifices, stops for limiting the range of rotor rotation from beginning to end positions to more than 90° but less than 180°, the plurality of pedestals being so angularly positioned on the rotor that during the course of rotor rotation from the beginning position (a) both inlet orifices are covered, (b) the cold orifice is progressively uncovered while the hot orifice remains covered, (c) the hot orifice is progressively uncovered while the cold orifice remains uncovered and (d) the cold orifice is progressively covered while the hot orifice remains uncovered thereby providing independent variation of hot and cold water to produce a gradual transformation from cold to hot as the rotor is turned, said hot and cold water supply lines being normally positioned on the left and right sides, respectively, of said axis, the rotor, upon disassembly of the valve, being 180°-rotatable about the axis relative to the stops, for providing, upon reassembly of the valve, above-identified features (a) through (d) when the hot and cold water supply line positions are reversed.

2. A mixing valve for connection to hot and cold water supply lines normally positioned to the left and the right of the valve, respectively, for feeding a variably proportioned mixture of hot and cold water to a shower head or the like comprising, in combination, a valve body presenting a planar discharge surface having spaced hot and cold inlet orifices with an outlet orifice generally centered on an axis between the inlet orifices, a rotor on the axis arranged opposite the discharge surface, the rotor having a plurality of arcuately spaced pedestals projecting axially in the direction of said discharge surface, a plurality of axially projecting sealing pads of resilient material mounted on said pedestals and terminating in a plane perpendicular to the axis and engaging said discharge surface at a axially perpendicular distance from the axis corresponding to the radius of the inlet orifices from the axis, stops for limiting the range of rotor rotation from beginning to end positions to more than 90° but less than 180°, the cold orifice having an associated pair of sealing pads of limited arcuate extent and so angularly spaced that the cold orifice is completely covered during the first and last portions of the range of rotor movement and is completely uncovered only during the central portion of the range of rotor movement, the hot orifice having an associated sealing pad of greater arcuate extent and so angularly positioned on the rotor that (a) the hot orifice is completely covered until the central portion of the range of rotor movement is reached, (b) progressively uncovered during the central portion of the range of rotor movement and (c) remains completely uncovered during the last portion of the last range of movement thereby to produce a gradual transformation from cold to hot as the rotor is turned, said hot and cold water supply line being normally positioned on the left and right sides, respectively, of said axis, the rotor, upon disassembly of the valve, being 180°-rotatable about the axis relative to the stops, for providing, upon reassembly of the valve, above-identified features (a) through (c) when the hot and cold water supply line positions are reversed.

3. A mixing valve for connection to hot and cold water supply lines normally positioned to the left and the right of the valve, respectively, for feeding a variably proportioned mixture of hot an cold water to a shower head or the like comprising, in combination, a valve body presenting a planar discharge surface having hot and cold inlet orifices with an outlet orifice generally centered on an axis between the inlet orifices, a cap of inverted cup shape having a rim sealed with respect to the planar discharge surface and having an end wall with an axial opening, a rotor having a disc mounted coaxially within the cap and having a shaft extending through the axial opening thereof, the rotor having a plurality of sealing pads projecting axially from the disc and terminating in a plane perpendicular to the axis for slidably engaging the discharge surface at an axially perpendicular distance from the axis equal to the axially perpendicular distance of the inlet orifices from the axis, stops for limiting the range of rotor rotation from beginning to end positions to more than 90° but less than 180°, the sealing pads including (a) a pair of generally circular pads of limited arcuate extent sealingly engageable with the cold inlet orifice at the respective limits fo rotor rotation and (b) a single pad of approximately double the arcuate extent of one of the circular pads sealingly engageable with the hot inlet orifice during approximately the first half of the range of rotor rotation, thereby providing a gradual transformation from cold to hot at the outlet orifice.

4. A mixing valve for connection to hot and cold water supply lines, normally positioned to the left and the right of the valve, respectively, for feeding a variably proportioned mixture of hot an cold water to a shower head or the like comprising, in combination, a valve body representing a planar discharge surface having spaced hot and cold inlet orifices with an outlet orifice generally centered on an axis between the inlet orifices, a cap of inverted cup shape having a rim sealed with respect to the planar discharge surface and having a cylindrical side wall and a circular end wall with an opening axially formed therein, a rotor having a disc fitted within the side wall of the cap and having a shaft extending through an axial opening in the end wall, the rotor having a plurality of angularly spaced axially projecting pedestals terminating in a plane perpendicular to the axis, resilient sealing pads on the pedestals for slidably engaging the discharge surface at an axially perpendicular distance from the axis equal to the axially perpendicular distance of the inlet orifices from the axis, stops for limiting the range of rotor rotation from beginning to end positions to more than 90° but less than 180°, the sealing pads being so angularly positioned as to provide a gradual transformation from cold to hot at the outlet orifice as the rotor is turned, the pedestals having an axial dimension substantially greater than the thickness of the disc so as to provide substantial spacing between the disc and the discharge surface for mixing of the hot and cold water in the space surrounding the pedestals prior to discharge from the outlet orifice.

5. A mixing valve for connection to hot and cold water supply lines for feeding a variably proportioned mixture of hot and cold water to a shower head or the like comprising, in combination, a valve body presenting a planar discharge surface having spaced hot and cold inlet orifices with an outlet orifice generally centered on an axis between the inlet orifices, a cap of inverted cup shape having a rim sealed with respect to the planar discharge surface and having a circular end wall with an opening axially formed therein, a rotor having a disc mounted coaxially within the cap and having a shaft extending through the axial opening thereof, the rotor having a plurality of pedestals axially projecting from the disc, sealing pads on the pedestals terminating in a plane perpendicular to the axis for slidably engaging the discharge surface at an axially perpendicular distance from the axis equal to the axially perpendicular distance of the inlet orifices from the axis, stops for limiting the range of rotor rotation from beginning to end positions to more than 90° but less than 180°, the sealing pads being so angularly positioned that during the course of rotor rotation from the beginning position (a) both inlet orifices are covered, (b) the cold orifice is progressively uncovered while the hot orifice remains uncovered, (c) the hot orifice is progressively uncovered while the cold orifice remains uncovered, and (d) the cold orifice is progressively covered while the hot orifice remains uncovered thereby providing a gradual transformation from cold to hot at the outlet orifice as the rotor is turned.

6. A mixing valve for connection to hot and cold water supply lines for feeding a variably proportioned mixture of hot and cold water to a shower head or the like comprising, in combination, a valve body presenting a planar discharge surface having spaced hot and cold inlet orifices with an outlet orifice generally centered on an axis between the inlet orifices, a rotor on the axis arranged opposite the discharge surface, the rotor having a plurality of hollow pedestals having respective axially oriented blind openings facing the discharge surface, resilient sealing pads respectively telescoped into the blind openings and closely but slideably fitted with respect thereto, each sealing pad having an associated coil spring seated in the rotor for biasing the pad axially into sealing engagement with the discharge surface, stops for limiting the range of rotor rotation from beginning to end positions to more than 90° but less than 180°, the pads being so angularly positioned that during the course of rotor rotation from the beginning position (a) both inlet orifices are covered, (b) the cold orifice is progressively uncovered while the hot orifice remains covered, (c) the hot orifice is progressively uncovered while the cold orifice remains uncovered and (d) the cold orifice is progressively covered while the hot orifice remains uncovered thereby providing a gradual transformation from cold to hot at the outlet orifice as the rotor is turned, each of the pads having an axial through-opening so that the pressure of the inlet water when the pad is engaged with an inlet orifice acts to assist the associated spring in pressing the pad against the discharge surface thereby to reduce the possibility of leakage at the discharge surface.

7. The combination as claimed in claim 3 in which the rotor is formed with a plurality of pedestals projecting axially in the direction of the discharge surface and in which the sealing pads are pads of resilient material mounted on the pedestals.

8. The combination as claimed in claim 3 or in claim 4 or in claim 5 in which the stops for limiting the range of rotor rotation are formed of a stop on the rotor movable therewith and a pair of stationary stops, the rotor having a first position for use when the hot and cold connections are respectively at the left and right hand sides of said axis and having provision for being rotated 180° relative to said rotor stop to a second position, upon disassembly of the valve, so that the rotor position is 180° removed from the first position when the hot and cold connections lie respectively on the right and left hand sides of said axis.

9. The combination as claimed in claim 3 or in claim 4 or in claim 5, in which the fixed stops are angularly spaced on the end wall of the cap and in which the movable stop is telescoped over the shaft, the shaft being of non-circular cross section and the movable stop having an axial opening of mating cross section and such as to enable the rotor shaft to be rotated, upon disassembly of the valve, by 180° about the rotor axis relative to the fixed and movable stops, depending upon whether the hot and cold connections are conventionally at the left an right hand sides of said axis, respectively, or whether such connections are reversed as where a pair of recited mixing valves are arranged back-to-back for connection to the same pair of water supply lines.

10. The combination as claimed in claim 3 or in claim 4 or in claim 5, in which the fixed stops are angularly spaced on the end wall of the cap and in which the movable stop is telescoped over the shaft, the shaft being of square cross section and the movable stop having an axial opening of mating cross section to enable the rotor shaft to be rotated, upon disassembly of the valve, by 180° about the rotor axis relative to the fixed and movable stops, depending upon whether the hot and cold connections are conventionally at the left and right hand sides of the valve body, respectively, or whether such connections are reversed as where a pair of recited mixing valves are arranged back-to-back for connection to the same pair of water supply lines.

11. The combination as claimed in claim 3 or in claim 4 or in in claim 5 including an escutcheon mounted on a wall, a knob having a deep opening axially formed therein and profiled to mate with the shaft in freely slideably telescope relation thereby to accommodate a varying distance between the wall and the valve body.

12. The combination as claimed in claim 1 or in claim 2 or in claim 3 or in claim 4 or in claim 5 or in claim 6 in which the planar discharge surface against which the sealing pads bear is formed of a disc of resilient plastic material chosen to have a low coefficient of friction with respect to the material of the sealing pads.

* * * * *